2 Sheets—Sheet 1.

W. SCOTT.

COTTON AND CORN-PLANTER AND FERTILIZER-DISTRIBUTER.

No. 183,422. Patented Oct. 17, 1876.

WITNESSES:
W. W. Hollingsworth
Colon C. Kenon

INVENTOR:
Wm Scott
BY
ATTORNEYS.

N. PETERS, PHOTO-LITHOGRAPHER, WASHINGTON, D. C.

2 Sheets—Sheet 2.

W. SCOTT.
COTTON AND CORN-PLANTER AND FERTILIZER-DISTRIBUTER.

No. 183,422. Patented Oct. 17, 1876.

WITNESSES:

INVENTOR:

BY

ATTORNEYS.

UNITED STATES PATENT OFFICE.

WILLIAM SCOTT, OF FREDERICKSBURG, VIRGINIA.

IMPROVEMENT IN COTTON AND CORN PLANTER AND FERTILIZER-DISTRIBUTER.

Specification forming part of Letters Patent No. 183,422, dated October 17, 1876; application filed August 17, 1876.

*To all whom it may concern:*

Be it known that I, WILLIAM SCOTT, of Fredericksburg, in the county of Spottsylvania and State of Virginia, have invented a new and Improved Cotton and Corn Planter and Fertilizer-Distributer; and I do hereby declare that the following is a full, clear, and exact description of the same, reference being had to the accompanying drawing, forming part of this specification, in which—

Figure 1:
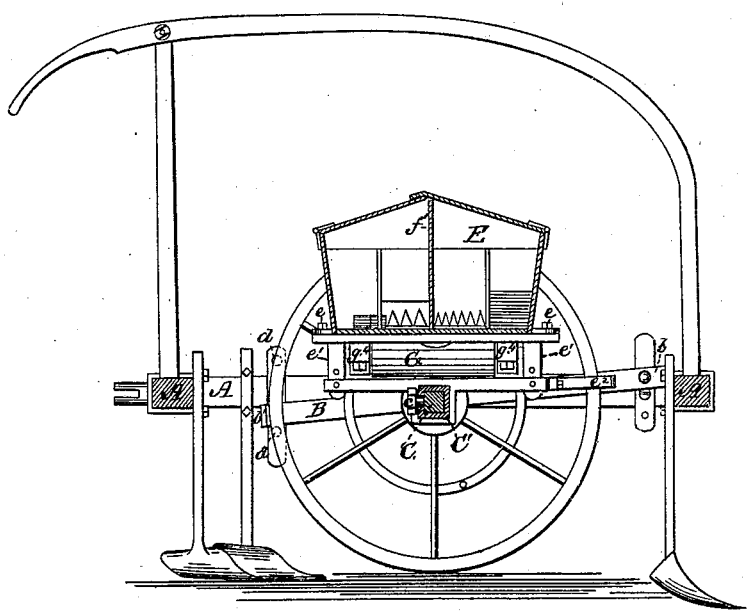
Figure 2:
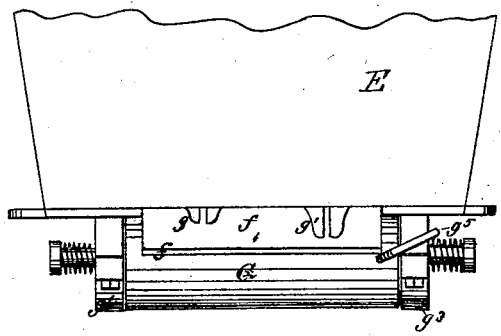
Figure 3:
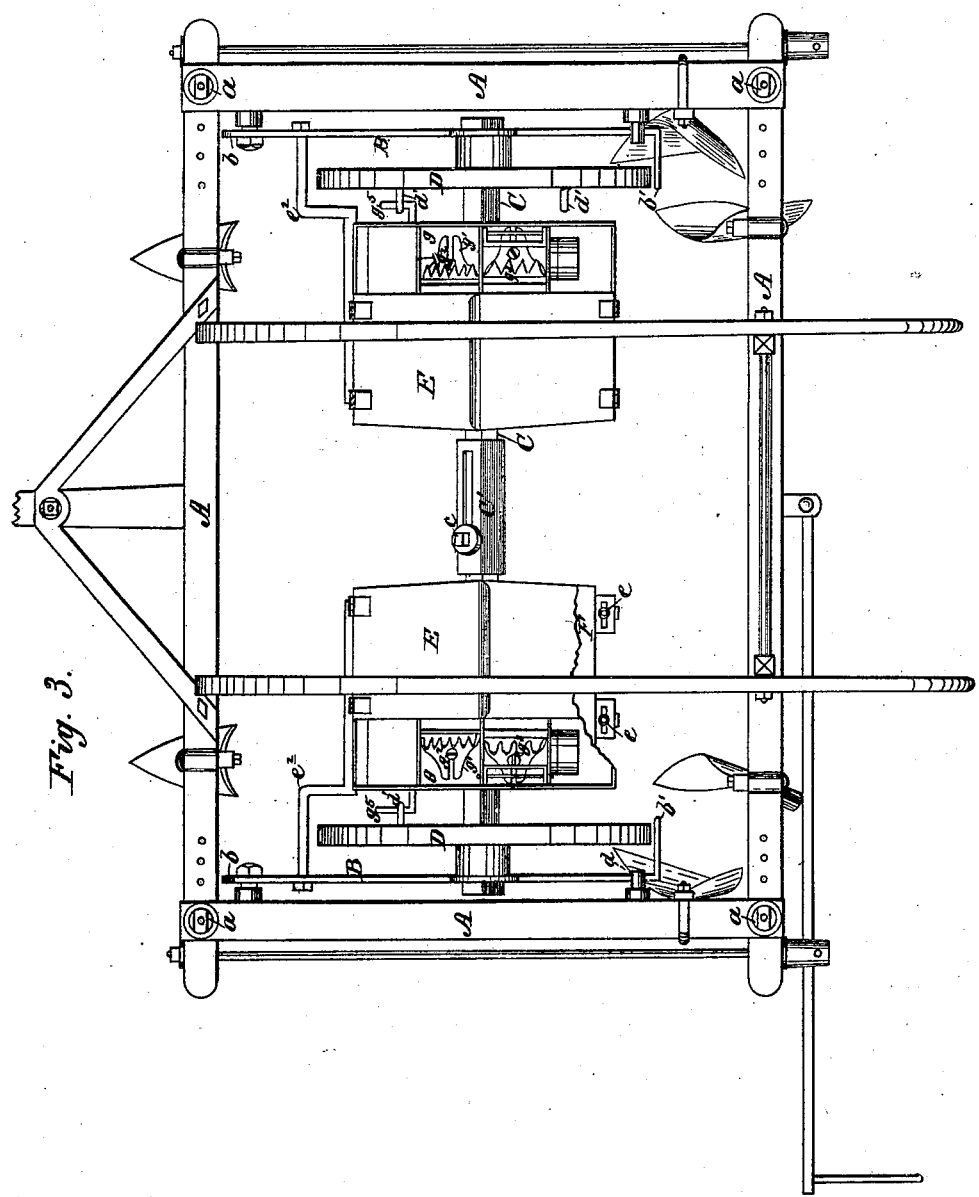

Figure 1 is a transverse section; Fig. 2, a detail view of the seed-box and reciprocating shaft with its attachments. Fig. 3 is a plan view.

The invention consists in attaching to the main shaft of the machine two or more hoppers, which are adjustable along said main shaft by means of slotted projections attached to their lower edges, which projections may be clamped at various positions on vertical frames attached to said main shaft. The bottoms of the hoppers are provided at their outer edges with rectangular openings closed by similarly-shaped covers attached to the upper part of vibrating shafts, that have their bearings in downward projections from the under surface of the hoppers. The covers have attached to their upper surfaces, and within the hoppers, adjustable feeders provided with outwardly-inclining teeth. The vibrating shafts and attached feeders are moved by arms fixed to the outer parts of said shafts, which arms are struck and moved downward, when the machine is in action, by tappets fixed at regular distances on the wheels of the machine. A spiral spring around one end of the axle of each vibrating shaft returns said shaft to its first position when a tappet has passed. Each hopper is provided with a transverse partition, which divides both it and its bottom opening, thus allowing two different materials to be planted or distributed at the same time.

In the drawing, A represents the main frame of the machine, which is made extensible laterally by means of the adjustable bolts $a\ a$ in the rear ends of its side bars, and has attached to it the usual shovels, coverers, handles, and marker, the latter in this case being reversible. Within, on the side bars of the frame A, pivot, at their front ends $b\ b$, the vibrating side bars B B, in which the main shaft C has its bearings, the rear ends of said bars $b'\ b'$, which are bent inward at right angles to form the rear scrapers for the wheels D, moving between limiting-pins $d\ d$ attached to perpendicular arms on the side bars of the main frame. E E are the hoppers, made adjustable along the main shaft by means of the slotted projections and clamp-screws $e\ e$, at front and rear, the slots and screws of said projections connecting with the upper horizontal bars of the vertical frames $e^1\ e^1$, which are attached at their middle portions to the main shaft, and are connected at their front end with the vibrating bars B B by the rectangularly-bent bars $e^2 e^2$, the outer portions of which form the front scrapers to the wheels D. The main shaft C is composed of two equal parts connected in the middle by the sleeve C', which is provided with the slot and clamp-screw $c$, in order to render the shaft extensible. F F are the bottoms of the hoppers, provided at their lower outer edges with the rectangular openings $f\ f$. The hoppers are further provided with transverse central partitions $f'\ f'$, which also divide the bottom opening. By this means two different kinds of material may be planted or distributed at same time. The openings $f f$ are closed by the rectangular plates $g\ g$, which are attached to the upper portions of the vibrating shafts G G, having their bearings in projections $g^4\ g^4$ from the under surfaces of the hoppers. Said rectangular plates have attached to their upper surfaces, and within the hopper, the adjustable feeders $g^1\ g^1$, provided with slots and clamps $g^2\ g^2$, to move farther from or nearer to the side of the hopper, and with the teeth $g^3\ g^3$ inclining forward to pull the material to be planted or distributed through the openings $f f$. The shafts G G and their attachments are turned outward and downward by the arms $g^5\ g^5$, fixed to their outer surfaces, being struck and pressed down, as the machine moves forward, by tappets $d^1\ d^1$ arranged at regular distances around the inner surface of the wheels, the distance apart of said tappets regulating, as is evident, the frequency of the machine planting or distributing.

The arrangement of the main shaft C on the vibrating bars B B will evidently cause said shaft and attached wheels to change their position to suit a deep or shallow furrow cut by the shovels fixed to the front of the main frame.

Having thus described my invention, what I claim as new is—

1. In a seeding-machine, the combination of the main frame A, main shaft C, hoppers E, slotted projections and clamp-screws e, and vertical frames e¹, substantially as shown and described, for the purpose specified.

2. In a seeding-machine, the combination, with the hopper E, having rectangular opening $ff$ in its bottom, of the vibrating shaft G, rectangular plate $g$, adjustable feeder $g^1$, arm $g^5$, and tappet or tappets $d$, substantially as shown and described, for the purpose specified.

WILLIAM SCOTT.

Witnesses:
    JAMES T. LAYTON,
    A. HOOTON,
    ALBERT HOOTON.